United States Patent
Van Wynsberghe et al.

(10) Patent No.: US 6,213,505 B1
(45) Date of Patent: Apr. 10, 2001

(54) APPARATUS FOR PROTECTING LOWER EXTREMITIES OF A VEHICLE OCCUPANT

(75) Inventors: Roy D. Van Wynsberghe, Mesa; Ahmad K. Al-Amin, Higley; Jess A. Cuevas, Scottsdale; Bryan W. Shirk; Timothy A. Swann, both of Mesa, all of AZ (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/498,177

(22) Filed: Feb. 4, 2000

(51) Int. Cl.⁷ .................................................. B60R 21/02
(52) U.S. Cl. ............................................ 280/748; 180/271
(58) Field of Search .................................... 280/748, 749; 180/271, 282

(56) References Cited

U.S. PATENT DOCUMENTS

| | | | |
|---|---|---|---|
| 3,782,756 | * | 1/1974 | Brown ................................... 280/749 |
| 4,198,075 | * | 4/1980 | Kob et al. ............................. 280/753 |
| 4,923,211 | * | 5/1990 | Klose ................................... 280/727 |
| 5,178,434 | * | 1/1993 | Krebs ................................... 296/37.3 |

OTHER PUBLICATIONS

Haland, Y. Hjerpe, E. Lovsund, P., "An Inflatable Carpet to Reduce the Loading of the Lower Extremeties–Evaluation by a New Sled Test Method with Toepan Intrusion", Paper No. 98–S1–P–18 16ᵗʰ ESV Conference, Windsor, Canada, Jun. 1–4, 1998.

* cited by examiner

Primary Examiner—Christopther P. Ellis
Assistant Examiner—Faye M. Fleming
(74) Attorney, Agent, or Firm—Tarolli, Sundheim, Covell, Tummino & Szabo, L.L.P.

(57) ABSTRACT

An apparatus (10) for helping to protect the lower extremities (44) of an occupant (40) of a vehicle (12) includes a sheet member (50) for extending along the floor (14) of the vehicle. The sheet member (50) has a surface (58) extending under the occupant's lower extremities between opposite first and second end portions (54, 52) of the sheet member. The sheet member (50) has a first condition in which the sheet member is spaced from the vehicle floor (14) by a first distance. The apparatus (10) includes an actuatable power source (84) for pulling at least the first end portion (54) of the sheet member (50) to tension the sheet member between the first end portion and the second end portion (52). The apparatus (10) also includes a vehicle crash sensor (80) for actuating the power source (84) in the event of a vehicle collision to tension the sheet member (50) and move the sheet member from the first condition to a second condition. In the second condition, the sheet member (50) is spaced from the vehicle floor (14) by a second distance that is greater than the first distance.

8 Claims, 2 Drawing Sheets

APPARATUS FOR PROTECTING LOWER EXTREMITIES OF A VEHICLE OCCUPANT

BACKGROUND OF THE INVENTION

1. Technical Field

The present invention relates to an apparatus for helping to protect a vehicle occupant in the event of a vehicle collision. In particular, the present invention is directed to an apparatus for moving the feet of a vehicle occupant off the floor of the vehicle in the event of a vehicle collision.

2. Description of the Prior Art

During a vehicle collision, particularly a frontal collision, it is possible for portions of the vehicle body to deform and penetrate the footwell of the vehicle where an occupant's lower legs and feet (lower extremities) are located. Contact between the deformed portions of the vehicle body and the occupant's feet can cause injury to the occupant.

The footwell typically includes a layer of carpet over the metal floor of the vehicle. It is known to place an inflatable device under the carpet. The inflatable device inflates, in the event of a vehicle collision, to move the carpet upward and thereby to move the occupant's feet away from portions of the vehicle floor which may be deforming.

SUMMARY OF THE INVENTION

The present invention is a vehicle safety apparatus for helping to protect the lower extremities of an occupant of a vehicle. The apparatus includes a sheet member for extending along the floor of the vehicle. The sheet member has a surface extending under the occupant's lower extremities between opposite first and second end portions of the sheet member. The sheet member has a first condition in which the sheet member is spaced from the vehicle floor by a first distance. The apparatus includes an actuatable power source for pulling at least the first end portion of the sheet member to tension the sheet member between the first end portion and the second end portion. The apparatus further includes a vehicle crash sensor for actuating the power source in the event of a vehicle collision to tension the sheet member and move the sheet member from the first condition to a second condition. In the second condition, the sheet member is spaced from the vehicle floor by a second distance that is greater than the first distance.

BRIEF DESCRIPTION OF THE DRAWINGS

The foregoing and other features of the invention will become more apparent to one skilled in the art upon consideration of the following description of the invention and the accompanying drawings, in which.

DESCRIPTION OF PREFERRED EMBODIMENTS

Figure 1:
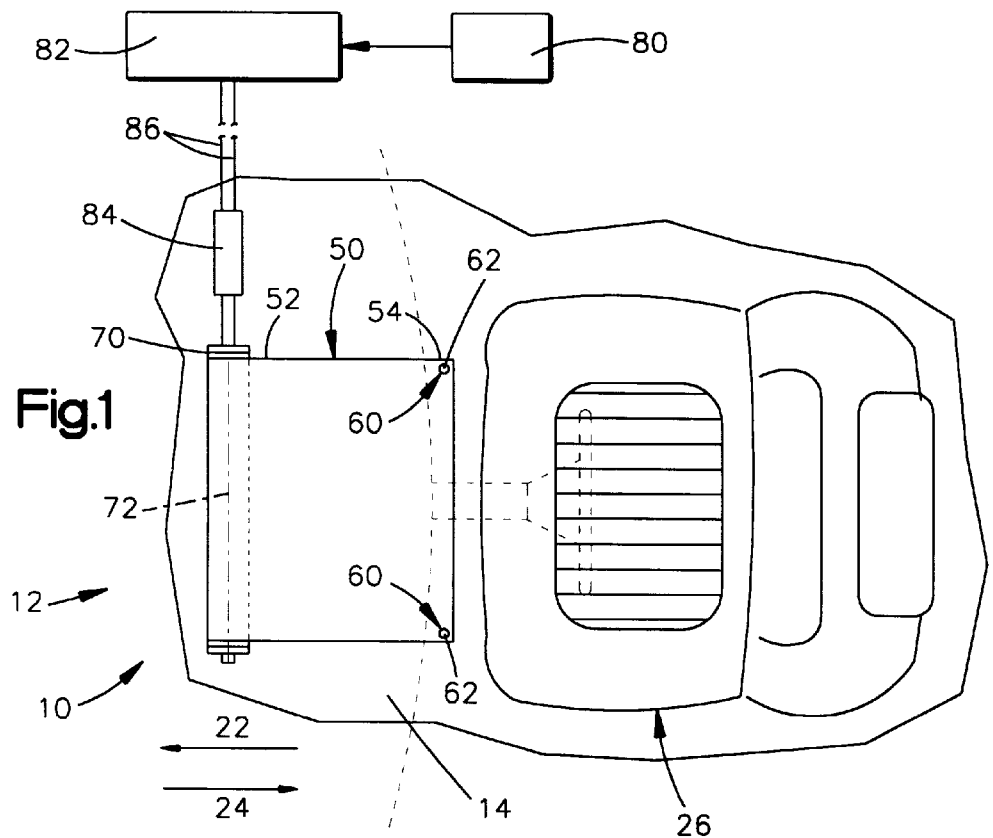
FIG. 1 is a schematic top plan view of a vehicle safety apparatus constructed in accordance with a first embodiment of the invention, shown in an unactuated condition.
Figure 2:
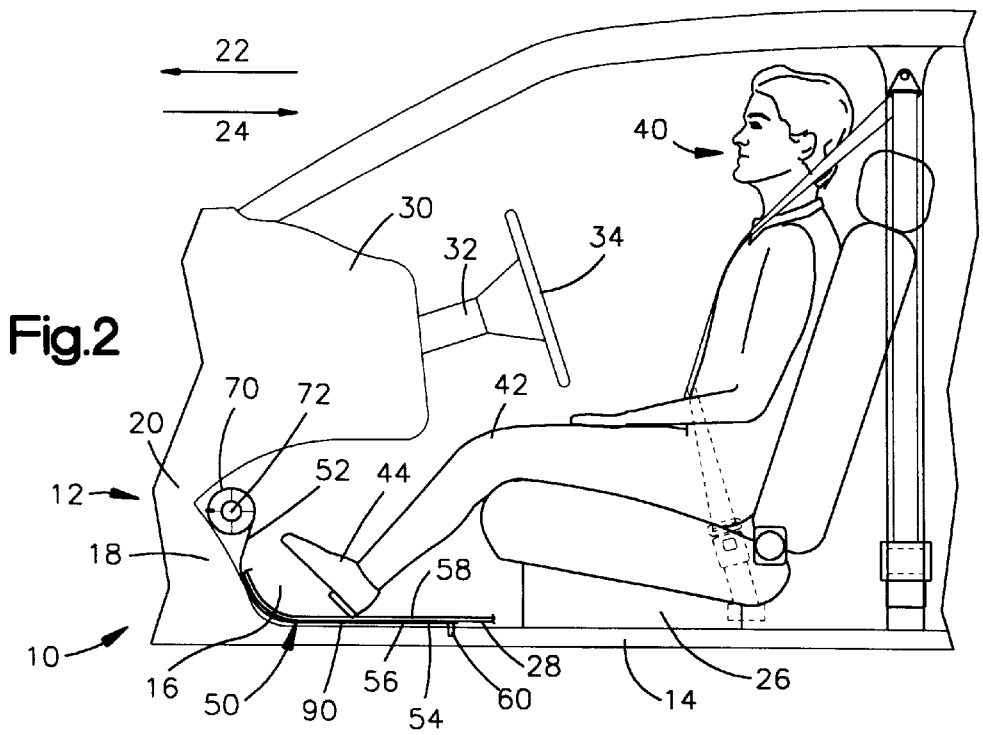
FIG. 2 is a schematic side view of the safety apparatus of FIG. 1.
Figure 3:
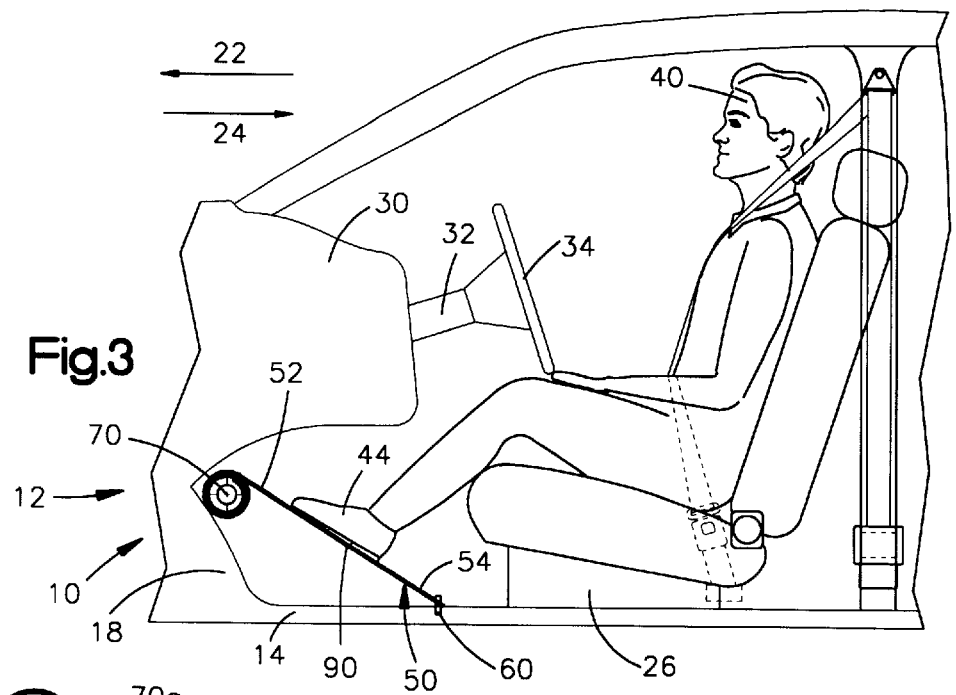
FIG. 3 is a view similar to FIG. 2 showing the safety apparatus of FIG. 1 in an actuated condition.

The present invention relates to an apparatus for helping to protect a vehicle occupant in the event of a vehicle collision, and is particularly directed to an apparatus for helping to protect the lower extremities of a vehicle occupant. As representative of the present invention, FIGS. 1 to 3 illustrate a safety apparatus 10 that is incorporated in a vehicle 12.

The vehicle 12 has a floor 14 that partially defines a driver's side footwell 16. The floor 14 has an upwardly sloping front portion 18 adjacent the firewall 20. (Forward and rearward directions in the vehicle 12 are indicated by the arrows 22 and 24, respectively.) The floor 14 extends rearward and underneath the driver's seat 26. A layer of carpet 28 (shown partially in FIG. 2) is disposed on the floor 14.

The vehicle instrument panel 30 extends rearward in the vehicle from the area of the firewall 20. The vehicle steering column 32 projects from the instrument panel 30 and supports the steering wheel 34 of the vehicle 12 at a location forward of the driver's seat 26.

The driver 40 of the vehicle 12 is seated in the seat 26. The driver's legs 42 extend forward and underneath the instrument panel 30. The driver's feet 44 are supported in the footwell 16 on the carpeting 28 that overlies the vehicle floor 14.

The safety apparatus 10 includes a flexible sheet member 50. The sheet member 50 may be made from plastic, fabric, metal foil, or another material that can fit beneath the vehicle carpeting 28, can be tensioned, and can transmit enough force to lift the driver's feet 44 off the vehicle floor 14.

The sheet member 50 has a forward end portion 52 disposed adjacent the front portion 18 of the vehicle floor 14. The sheet member 50 has an opposite back end portion 54 disposed adjacent the driver's seat 26. The sheet member 50 has a lower major side surface 56 that rests on or is presented toward the vehicle floor 14. The sheet member 50 has an upper major side surface 58 that is presented toward and extends beneath the driver's feet 44.

The safety apparatus 10 also includes an anchor indicated schematically at 60. The anchor 60 is a structure that secures the back end portion 54 of the sheet member 50 to a portion of the vehicle 12 to block movement of the back end portion in the forward direction 22 in the vehicle. The anchor 60 as illustrated comprises a plurality of fasteners such as screws 62 extending into the vehicle floor 14. The anchor 60 could, alternatively, be an adhesive material, or an elongate member such as a strip fastener. The back end portion 54 of the sheet member 50 is secured directly to the vehicle floor 14 in the illustrated embodiment. The back end portion 54 of the sheet member 50 could, alternatively, be secured to another portion of the vehicle 12, such as the seat 26.

The safety apparatus 10 further includes a spool 70. The spool 70 is a rotatable member on which a portion of the sheet member 50 can be wound to shorten the length of the sheet member between the spool and the anchor 60. The spool 70 is supported on the vehicle 12 for rotation about an axis 72 that extends generally perpendicular to the front-to-back extent of the sheet member 50. The forward end portion 52 of the sheet member 50 is connected to the spool 70 for rotation with the spool about the axis 72.

The safety apparatus 10 includes a crash sensor 80 and associated vehicle electric circuitry 82. The crash sensor 80 is a known device operative to sense a vehicle event, such as a collision, for which protection of the legs 42 and feet 44 of the driver 40 may be desired. The vehicle electric circuitry 82 is operative in response to the crash sensor 80 to send an appropriate actuation signal to an actuatable power source 84 over lead wires 86.

The power source 84 is a known device capable, when actuated, of effecting rotation of the spool 70 about the axis 72. The power source 84 may be, for example, a source of stored gas (such as an air bag inflator), a seat belt pretensioning device, a releasable compressed spring or a motor.

The sheet member 50 normally rests adjacent the vehicle floor 14 in a first condition in which it is untensioned. In the untensioned condition, the sheet member 50 has a non-planar configuration in which an intermediate portion 90 of the sheet member 50, disposed under the driver's feet 44, is not in a straight line (as viewed from the side) between the anchor 60 and the point at which the sheet member extends from the spool 70.

The intermediate portion 90 of the sheet member 50 is disposed at a location spaced from the vehicle floor 14 by a first, relatively small, distance. This first distance may, in fact, be zero, if the sheet member 50 is resting directly on the vehicle floor 14. In the untensioned condition, the sheet member 50 does not exert any upwardly directed force on the driver's feet 44.

If conditions indicative of a vehicle collision are sensed by the crash sensor 80, the vehicle electric circuitry 82 sends an actuation signal over the lead wires 86 to the power source 84. The power source 84 is actuated and effects rotation of the spool 70 about the axis 72. As the spool 70 rotates, the front end portion 52 of the sheet member 50 is taken up or wound on the spool 70, removing slack from the sheet member. The sheet member 50 is thus tensioned between the spool 70 and the anchor 60.

As the sheet member 50 is tensioned, it tends to assume a planar condition as illustrated in FIG. 3, extending linearly between the spool 70 and the anchor 60. The intermediate portion 90 of the sheet member 50 moves away from the vehicle floor 14, lifting the driver's feet 44 off the floor. The sheet member 50, when in the tensioned condition, supports the driver's feet 44 at a location spaced from the vehicle floor 14 by a second distance that is greater than the first distance. This repositioning of the sheet member 50 can help to protect the driver's feet 44 and legs 42 from injury resulting from the penetration of deformed vehicle body parts into the footwell 16 of the vehicle 12.

Figure 4:
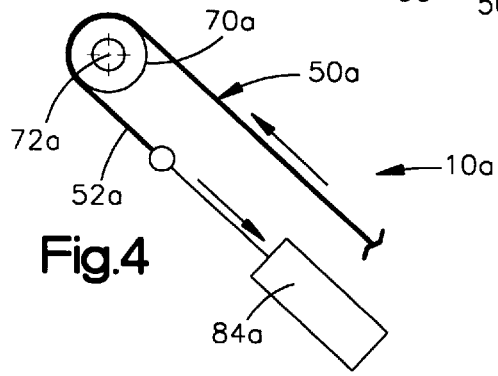
FIG. 4 is a schematic illustration of a portion of a safety apparatus constructed in accordance with a second embodiment of the invention.

FIG. 4 illustrates schematically a portion of a vehicle safety apparatus 10a in accordance with a second embodiment of the invention. The safety apparatus 10a is generally similar to the safety apparatus 10 (FIGS. 1–3), and similar parts are given similar reference numerals with the suffix "a" added. In the safety apparatus 10a, a power source 84a is operative to provide linear movement rather than rotational movement. The power source 84a is connected to an end portion 52a of a sheet member 50a. The sheet member 50a extends from its front end portion 52a around a pulley or other curved member 70a. Upon actuation of the power source 84a, the front end portion 52a of the sheet member 50a is pulled linearly, rather than rotated, to tension the sheet member.

In an alternative embodiment (not shown) similar to the embodiment of FIG. 4, neither end portion of the sheet member 50a is anchored. Instead, a separate pulley or roller is provided for each end portion of the sheet member 50a, and one or more power sources is used to pull on either one or both end portions of the sheet member.

Figure 5:
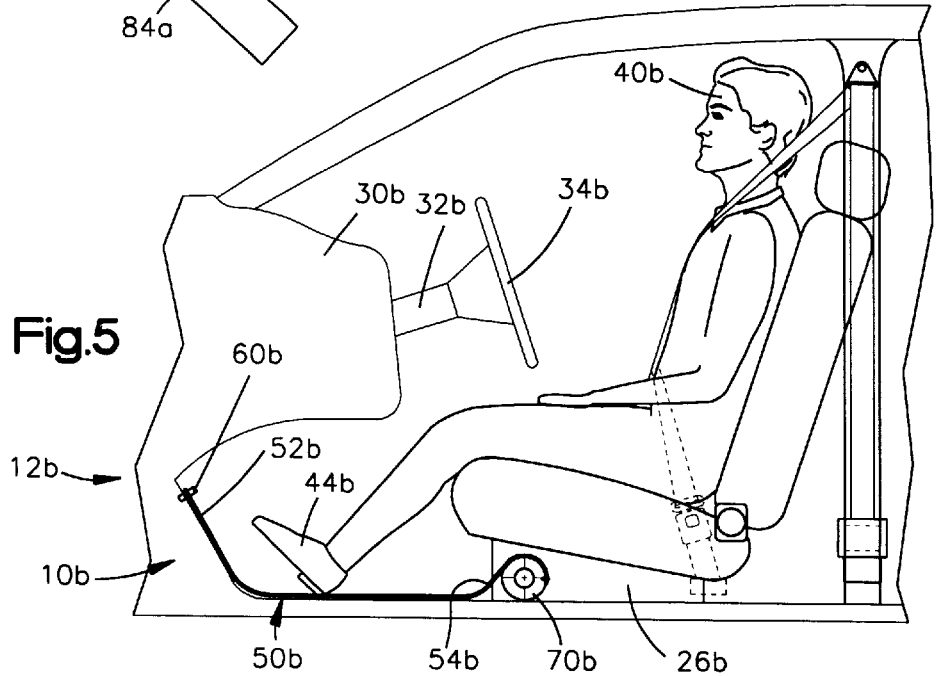
FIG. 5 is a schematic illustration similar to FIG. 2 of a safety apparatus constructed in accordance with a third embodiment of the invention.

FIG. 5 illustrates schematically a vehicle safety apparatus 10b in accordance with a third embodiment of the invention. The safety apparatus 10b is generally similar to the safety apparatus 10 (FIGS. 1–3), and similar parts are given similar reference numerals with the suffix "b" added.

In the safety apparatus 10b, the spool 70b is located under the driver's seat 26. The back end portion 54b of the sheet member 50b is connected with the spool 70b for rotation with the spool. The front end portion 52b of the sheet member 50b is secured by an anchor 60b to the front portion 18b of the vehicle floor 14b. Upon actuation of the power source (not shown) of the safety apparatus 10b, the back end portion 54b of the sheet member 50b is taken up to tension the sheet member. Alternatively, the back end portion 54b of the sheet member 50b can be connected to the seat 26. Actuation of the power source would move the seat 26 rearward in the vehicle, to tension the sheet member 50b.

From the above description of the invention, those skilled in the art will perceive improvements, changes and modifications in the invention. For example, a safety apparatus of the present invention can be used on a passenger side rather than driver side of a vehicle. Such improvements, changes and modifications within the skill of the art are intended to be covered by the appended claims.

Having described the invention we claim:

1. A vehicle safety apparatus for helping to protect the lower extremities of an occupant of a vehicle, said apparatus comprising:

a sheet member for extending along the floor of the vehicle, said sheet member having a surface extending under the occupant's lower extremities between opposite first and second end portions of said sheet member, said sheet member having a first condition in which said sheet member is spaced from the vehicle floor by a first distance;

an actuatable power source for pulling at least said first end portion of said sheet member to tension said sheet member between said first end portion and said second end portion; and a vehicle crash sensor for actuating said power source in the event of a vehicle collision to tension said sheet member and move said sheet member from the first condition to a second condition in which said sheet member is spaced from the vehicle floor by a second distance that is greater than the first distance.

2. An apparatus as set forth in claim 1 comprising a spool to which said first end portion of said sheet member is connected, said actuatable power source rotating said spool to pull said first end portion of said sheet member to tension said sheet member.

3. An apparatus as set forth in claim 2 wherein said sheet member when untensioned has a non-planar configuration and does not extend in a straight line between said second end portion and said spool.

4. An apparatus as set forth in claim 2 wherein said spool is located adjacent a vehicle firewall.

5. An apparatus as set forth in claim 2 wherein said spool is located in a vehicle seat.

6. An apparatus as set forth in claim 1 comprising a curved member about which said sheet member extends, said actuatable power source when actuated pulling on said first end portion of said sheet member to tension said sheet member between said curved member and said second end portion of said sheet member.

7. An apparatus as set forth in claim 1 wherein said sheet member is disposed between a vehicle carpeting and a vehicle floor.

8. An apparatus as set forth in claim 1 wherein said first end portion of said sheet member is a back end portion of said sheet member and said second end portion of said sheet member is a front end portion of said sheet member.

* * * * *